United States Patent Office 2,865,931
Patented Dec. 23, 1958

2,865,931

MALEINATED ELEOSTEARIC ACIDS

Charles H. Mack, New Orleans, and William G. Bickford, Metairie, La., assignors to the United States of America as represented by the Secretary of Agriculture No Drawing. Application November 3, 1953
Serial No. 390,101

5 Claims. (Cl. 260—348)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to valuable new acids and esters which are particularly useful as plasticizers and plasticizer extenders for vinyl resins.

More particularly, this invention provides $C_{22}$ tricarboxylic acids containing a centrally located six-membered hydrocarbon ring attached to an exocyclic epoxidized ethylene group, and their anhydrides and esters of the formula

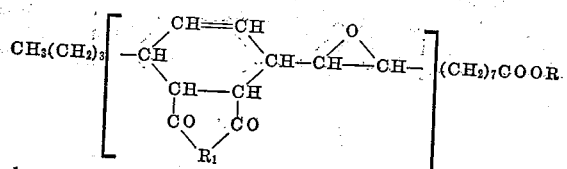

where R represents a member of the group consisting of hydrogen and alkyl radicals and $R_1$ represents a member of the group consisting of —O— and (—OR)$_2$. These compounds are produced by the epoxidation of the addition products produced by the reaction of a maleate of the formula

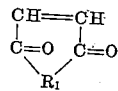

with an eleostearate of the formula $CH_3(CH_2)_3(CH=CH)_3(CH_2)_7COOR$

The addition products each contain a centrally located 6-membered hydrocarbon ring attached to an exocyclic ethylene group to provide a central grouping of the formula

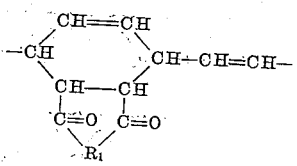

In the case of the addition products derived from the alpha-eleostearates the central grouping is arranged with the ethylene group adjacent to the longer portion of the chain. The beta-eleostearates on the other hand, yield a mixture of two addition products, one containing the above arrangement, and the other containing the opposite arrangement. In either case the epoxidation of the addition products produces epoxy-group-containing tricarboxylic acids, anhydrides and esters, of the formula illustrated above.

The acids produced by the addition of maleic acid to an eleostearic acid are hereinafter referred to as "eleomaleic acids," and "eleomaleinates" refers to the acids or their esters. Eleomaleic acids derived from alpha-eleostearic acid are referred to as "alpha-eleomaleinates" and those derived from beta-eleostearic acid, as "beta-eleomaleinates." Eleomaleic acids in which the six-membered ring is unsaturated are referred to as "eleomaleinates" or "cyclohexenyl eleomaleinates," and those in which the six membered ring is saturated, are referred to as "cyclohexyl eleomaleinates." The eleomaleic acids contain an ethylenic group in the open chain portion of the molecule adjacent to the six membered ring. Derivatives of the eleomaleic acids in which this ethylenic group has been converted to an epoxy group are referred to as "epoxidized eleomaleinates"; those in which it has been converted to a —CH$_2$CH$_2$— group, as "hydrogenated eleomaleinates"; those in which it has been converted to a

—CHOHCH$_2$— group, as "monohydroxylated eleomaleinates"; those in which it has been converted to a —CHOHCHOH— group, as "dihydroxylated eleomaleinates"; etc.

In general, in accordance with this invention, epoxidized eleomaleinates are produced by reacting maleates with eleostearates to produce eleomaleates, and epoxidizing the eleomaleates.

Eleomaleinates can be prepared by reacting alpha or beta-eleostearic acids, mixtures thereof, or esters thereof with maleic anhydride, maleic acid, or esters thereof, in the presence or absence of solvents at a temperature, at which reaction occurs, between the freezing point and the decomposition temperature of the reactants or products.

Esters of eleomaleic acid anhydrides can be prepared by reacting esters of the eleostearic acids with maleic anhydride. Tung oil or esterified tung oil acids can be employed as the esters of the eleostearic acids. The carboxyl groups contained in the eleomaleic acid anhydrides can be esterified by reacting them with alcohols in the presence of esterification catalysts and in the presence or absence of solvents.

The reaction of the eleostearates with the maleates produces cyclohexenyl eleomaleinates. The cyclohexenyl eleomaleinates can be converted to cyclohexyl eleomaleinates by hydrogenation with hydrogen in the presence of a nickel catalyst.

The reaction of eleostearates with maleates produces eleomaleinates containing an ethylenic group in the open chain portion of their molecules adjacent to the 6 membered hydrocarbon ring. Such eleomaleinates can be converted to dihydroxylated eleomaleinates by reacting them with a peroxide, such as hydrogen peroxide, in the presence of a weak acid such as acetic acid. The eleomaleinate used can be an acid, anhydride or ester. The dihydroxylated eleomaleinates can be partially or completely esterified by reacting them with esterifying agents, such as acids, acid anhydrides and the like.

The eleomaleinates can be converted to epoxidized eleomaleinates by reacting them with a peracid in an inert mutual solvent. The use of perbenzoic or peracetic acid, dissolved either in chloroform or in acetic acid, is preferred. The eleomaleinates used can be acids, anhydrides or esters.

Hydroxylated eleomaleinates can be produced by reacting eleomaleinates with a peroxide such as hydrogen peroxide in the presence of a weak acid such as acetic acid. The reaction can be controlled to produce the mono or dihydroxylated eleomaleinates. Hydroxylated cyclohexyl eleomaleinates can be prepared by reacting epoxidized eleomaleinates with hydrogen in the presence of a palladium catalyst. In either of the reactions the eleomaleinate can be an acid, acid anydride or ester.

Illustrative examples of alcohols with which the carboxyl groups attached to the open chain or to the six membered hydrocarbon ring of the eleomaleinates and their derivatives can be esterified, include: saturated or unsaturated aliphatic alcohols such as methyl, butyl, dodecyl, and the like saturated alcohols, and allyl, methallyl, propargyl and oleyl and the like unsaturated alcohols; alicyclic alcohols such as cyclohexanol, cyclopentanol, benzyl alcohol and the like; aralkyl alcohols such as benzyl, the alpha-hydroxycresols, and the like; and polyhydric alcohols such as glycerol, 4-hydroxy cyclohexanol, and the like.

The following examples are illustrative of the invention:

EXAMPLE 1

Alpha-eleomaleic acid anhydride

Alpha-eleostearic acid was prepared by saponifying alpha tung oil and isolating the liberated alpha-eleostearic acid by the process described in Industrial Engineering Chemistry 17, 467, 1945.

Equimolar quantities of the alpha-eleostearic acid and maleic anhydride were heated at 80° C. under an atmosphere of carbon dioxide until the characteristic yellow color disappeared. The alpha-eleomaleic acid anhydride produced, after a crystallization from 90% methanol, was a white crystalline solid, melting point 64° C., having a formula

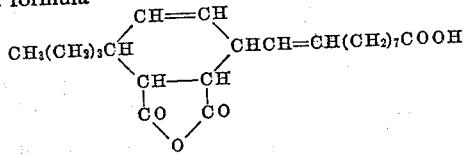

EXAMPLE 2

Beta-eleomaleic acid anhydride

Beta-eleostearic acid anhydride was prepared by saponifying beta tung oil and reacting the isolated beta-eleostearic acid with maleic anhydride by the process described in Example 1. The beta-eleomaleic acid anhydride, after recrystallization from 90% methanol, was a white crystalline solid, M. P. 77° C.

EXAMPLE 3

Epoxidized eleomaleic acid anhydrides

A 7.5 gram portion of beta-eleomaleic acid anhydride produced as described in Example 2 was dissolved in 50 ml. of 0.4 normal perbenzoic acid dissolved in chloroform and maintained at 0° for 41 hours. By this time the reaction was 95% complete and the reaction mixture contained a white precipitate.

The white precipitate was isolated and recrystallized from absolute methanol. The recrystallized product melted at 144° C. and an elementary analysis indicated its formula to be $$C_{22}H_{32}O_6$$

The chloroform was distilled off from the filtrate portion of the reaction mixture and the eleomaleinate product remaining was recrystallized from absolute methanol. The recrystallized product melted at 118° C. and an elementary analysis indicated its formula $C_{22}H_{32}O_6$.

The epoxidized beta-eleomaleic acid anhydrides have the formulas

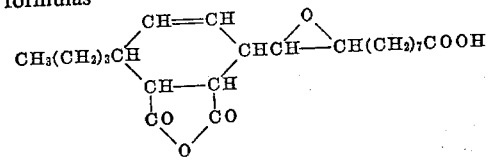

and

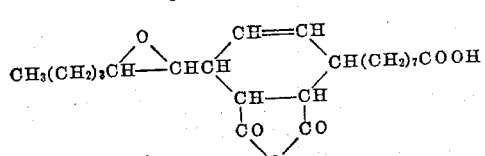

in which the epoxy rings are trans.

EXAMPLE 4

Triesters of eleomaleic acids

Tributyl alpha-eleomaleinate of the formula

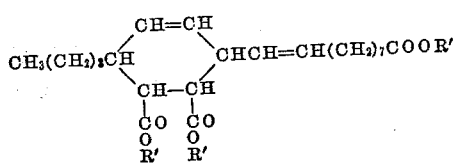

where R' is a butyl radical was prepared by refluxing a solution of one mole of alpha-eleomaleic acid anhydride, produced as described in Example 1, 6 moles of butanol, and 6 grams of paratoluene sulfonic acid dissolved in 1.5 liters of toluene, for 20 hours, while isolating the water condensing with the refluxing vapor. The produced tributyl alpha-eleomaleinate was isolated by washing the reaction mixture was 5% aqueous sodium hydroxide and distilling off the solvent and unconverted reactants under reduced pressure.

A triester of the same formula where R' is a methyl radical was produced by heating a mixture of two parts of methyl alpha-eleostearate and 1 part of dimethyl maleate to about 200° C. for about 3 hours. The triester was isolated by distilling off the unreacted esters under vacuum. The ester boiled at 200° under a pressure 0.2 mm. of Hg.

A triester of the same formula where R' is a cyclohexyl or aralkyl radical is produced in the same way by using an alicyclic alcohol such as cyclohexanol or an aralkyl alcohol such as benzylalcohol in place of the butanol.

EXAMPLE 5

Esters of epoxidized eleomaleic acids

A triester of the formula

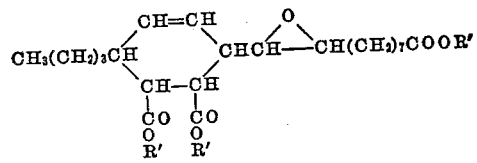

where R' is a butyl radical was prepared by reacting tributyl alpha-eleomaleinate, prepared as described in Example 4, with perbenzoic acid dissolved in chloroform, by the process described in Example 3.

The ester so produced was isolated by stirring the reaction mixture with barium oxide and sodium sulfate, filtering to remove benzoic and perbenzoic acids and removing the solvent by distillation under reduced pressure. The structure of the ester was verified by means of infrared spectra.

Esters of the same formula where R' is an alicyclic or an aralkyl radical are produced in the same way by employing the corresponding alicyclic or aralkyl alcohol in place of the butanol.

EXAMPLE 6

Dihydroxylated eleomaleic acids

A 1-mole portion of alpha-eleomaleic acid, prepared as described in Example 1, was dissolved in 1 liter of glacial acetic acid and slowly mixed with 200 ml. of 30% hydrogen peroxide. After the initial exothermic reaction had subsided, the reaction was maintained at 80° C. for 1 hour.

The product was isolated by diluting the reaction mixture with water, selectively dissolving the organic components in ether, washing and drying the ether solution to free it from acids and water and distilling off the ether under reduced pressure. The dihydroxy alpha-eleomaleinate has the formula

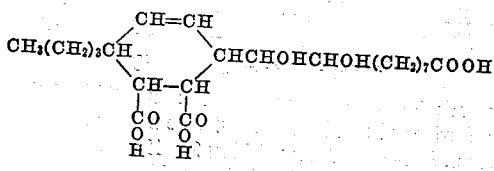

EXAMPLE 7

Esters of dihydroxy eleomaleic acids

Diesters: A diacetoxy ester having the formula

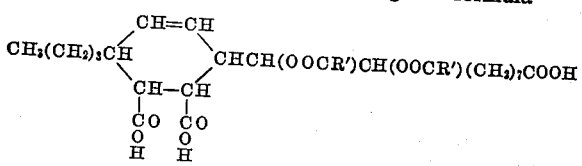

where R' is a methyl radical, was prepared by reacting dihydroxy alpha-eleomaleic acid, prepared as described in Example 6, with an excess of acetic anhydride.

Esters of the same formula in which R' is an alicyclic or an aralkyl radical, are produced in the same way by replacing the acetic anhydride with the corresponding alicyclic or aralkyl esterifying agent.

Triesters: An ester of the formula

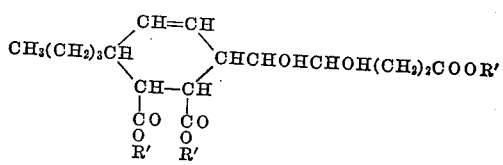

where R' is a butyl radical was prepared by reacting the three carboxyl groups of dihydroxy alpha-eleomaleic acid with butanol in the presence of para-toluene sulfonic acid by the esterification procedure described in Example 4.

Esters of the same formula where R' is an alicyclic or an aralkyl alcohol are produced in the same way by replacing the butanol with a corresponding alicyclic or aralkyl alcohol.

Pentaesters: An ester of the formula

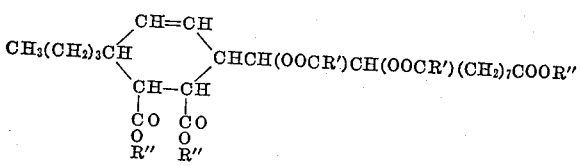

where R' is a methyl radical and R" is a butyl radical was prepared by reacting the tributyl epoxidized eleomaleinate of Ex. 5 with a mixture of acetic acid and acetic anhydride.

Esters of the same formula in which R' and R" are the same or different aliphatic, alicyclic, or aralkyl radicals are prepared in the same way by replacing the respective acid and alcohol esterifying agents with the corresponding aliphatic, alicyclic or aralkyl esterifying agents.

EXAMPLE 8

Monohydroxylated cyclohexyl eleomaleic acids

A portion of epoxidized alpha-eleomaleic acid was mixed with 0.1 part by weight of a 10% palladium-carbon catalyst and 5 parts of glacial acetic acid. The mixture was agitated at about room temperature while hydrogen was introduced under about 30 lbs. pressure. The product produced was isolated by filtering off the catalyst and distilling off the acetic acid. The product has the formula

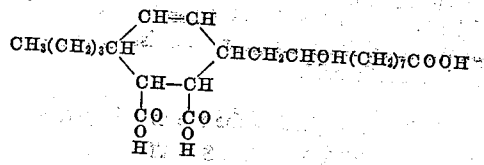

EXAMPLE 9

Esters of monohydroxylated cyclohexyl eleomaleic acids

Monoesters: An ester of the formula

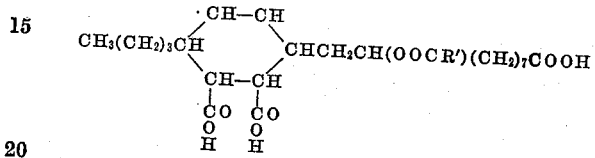

where R' is a methyl radical was prepared by refluxing one part of monohydroxy cyclohexyl alpha-eleomaleic acid with 5 parts of acetic anhydride for about 5 hours. The ester was isolated by distilling off the acetic anhydride.

Esters of the same formula where R' is an aliphatic, alicyclic or aralkyl radical are prepared in the same way by replacing the acetic anhydride with the corresponding aliphatic, alicyclic or aralkyl acylating agent.

Tetraesters: An ester of the formula

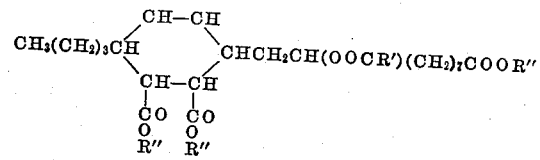

where R' is a methyl radical and R" is a butyl radical was prepared by reacting a mono acetoxy ester prepared as described above with butanol in the presence of para-toluenesulfonic acid.

Tetraesters of the same formula where R' and R" are the same and different aliphatic, alicyclic or aromatic radicals are prepared in the same way by replacing the acylating and alcoholating esterifying agents with the corresponding aliphatic, alicyclic or aromatic agents.

We claim:

1. An epoxidized eleomaleate of the formula

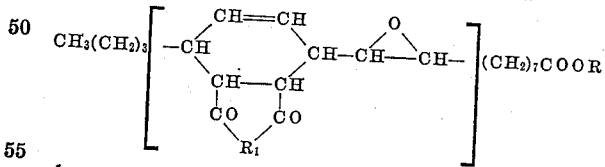

where R represents a member of the group consisting of hydrogen and alkyl radicals and $R_1$ represents a member of the group consisting of —O— and $(-OR)_2$.

2. A tricarboxylic acid epoxidized eleomaleate of the formula of claim 1 in which R represents a hydrogen atom and $R_1$ represents $(-OR)_2-$.

3. A tributyl epoxidized eleomaleate of the formula of claim 1 where R represents a butyl radical and $R_1$ represents $(-OR)_2-$.

4. A process for producing a trialkyl epoxidized eleomaleic acid ester which comprises heating a mixture of an alkyl tung oil acid ester and an excess of a dialkyl maleate to produce a trialkyl eleomaleic acid ester, separating the so-produced ester from the reaction mixture, adding the separated ester to a solution of a peracid in an inert solvent which is a mutual solvent for both the ester and the peracid, the amount of peracid being in excess of the amount required to react with the ester, permitting the ester to react with peracid while dissolved in the solvent to produce the epoxidized derivative of the ester, and then separating and recovering the epoxidized ester from the reaction mixture.

5. The process of claim 4 wherein the peracid is a member selected from the group consisting of perbenzoic acid and peracetic acid.

References Cited in the file of this patent

UNITED STATES PATENTS

| | | |
|---|---|---|
| 2,033,132 | Ellis | Mar. 10, 1936 |
| 2,146,671 | Ellis | Feb. 7, 1939 |
| 2,188,883 | Clocker | Jan. 30, 1940 |
| 2,312,731 | Salathiel | Mar. 2, 1943 |
| 2,444,328 | Blair | June 29, 1948 |

OTHER REFERENCES

Morrell: Trans Faraday Soc., 32: 209–215 (1936).
Bickford et al.: Jour. Am. Oil Chem. Soc., vol. XXX, No. 9, pp. 376–381 (received May 26, 1953).
Morrell et al.: J. C. S., 1932, pp. 2251–4.